United States Patent [19]

Saotome

[11] Patent Number: 4,835,387

[45] Date of Patent: *May 30, 1989

[54] RADIATION IMAGE READ-OUT APPARATUS

[75] Inventor: Shigeru Saotome, Kanagawa, Japan

[73] Assignee: Fuji Photo Film Co. Ltd., Kanagawa, Japan

[*] Notice: The portion of the term of this patent subsequent to Mar. 28, 2006 has been disclaimed.

[21] Appl. No.: 741,338

[22] Filed: Jun. 5, 1985

[30] Foreign Application Priority Data

Jun. 5, 1984 [JP] Japan .................................. 59-115127

[51] Int. Cl.4 .............................................. G03C 5/16
[52] U.S. Cl. ................................. 250/327.2; 250/484.1
[58] Field of Search ........................... 250/327.2, 484.1

[56] References Cited

U.S. PATENT DOCUMENTS 4,258,264  3/1981  Kotera et al. ..................... 250/484.1
4,346,295  8/1982  Yanaka et al. .................... 250/327.2

Primary Examiner—Carolyn E. Fields
Assistant Examiner—Richard Hanig
Attorney, Agent, or Firm—Sughrue, Mion, Zinn, Macpeak & Seas

[57] ABSTRACT

A radiation image read-out apparatus comprises a source for emitting stimulating rays for scanning a stimulable phosphor sheet carrying a radiation image stored therein, a photoelectric read-out means for detecting light emitted by the stimulable phosphor sheet when it is scanned by stimulating rays, and a reflection mirror positioned near a portion of the stimulable phosphor sheet where stimulating rays impinge thereupon for reflecting light emitted by the stimulable phosphor sheet towards the photoelectric read-out system. A member for absorbing the stimulating rays reflected by the stimulable phosphor sheet is positioned for insertion into and withdrawal from the space between the reflection mirror and the portion of the stimulable phosphor sheet where stimulating rays for scanning impinge upon the stimulable phosphor sheet.

4 Claims, 1 Drawing Sheet

RADIATION IMAGE READ-OUT APPARATUS

BACKGROUND OF THE INVENTION

1. Field of the Invention

This invention relates to a radiation image read-out apparatus for use in a radiation image recording and reproducing system.

2. Description of the Prior Art

When certain kinds of phosphors are exposed to a radiation such as X-rays, α-rays, β-rays, γ-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. No. 4,258,264 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinbelow referred to as a stimulable phosphor sheet) is first exposed to a radiation passing through an object to have a radiation image stored therein, and is then scanned with stimulating rays such as a laser beam which cause it to emit light in the pattern of the stored image. The light emitted by the stimulable phosphor sheet upon stimulation thereof is photoelectrically detected and converted to an electric image signal, which is processed as desired to reproduce a visible image on a recording medium such as a photographic light-sensitive material or on a display device such as a cathode ray tube (CRT).

FIG. 2 is a perspective view showing the conventional read-out apparatus used in the aforesaid radiation image recording and reproducing system for scanning a stimulable phosphor sheet carrying a radiation image stored therein by stimulating rays such as a laser beam which cause the sheet to emit light in proportion to the stored radiation energy, and photoelectrically detecting the emitted light.

In the apparatus of FIG. 2, stimulating rays 2 are emitted by a stimulating ray source 1, and the beam diameter of the stimulating rays 2 is strictly adjusted by a beam expander 3. The stimulating rays 2 are then deflected by a light deflector 4 formed of a galvanometer mirror or the like, and are made to impinge upon the stimulable phosphor sheet 10 by a plane reflection mirror 5. Between the light deflector 4 and the plane reflection mirror 5 is positioned an fθ lens 6 for maintaining the beam diameter of the stimulating rays 2 uniform during the equal-speed scanning of the stimulating rays 2 on the stimulable phosphor sheet 10. While the stimulating rays 2 impinge upon the stimulable phosphor sheet 10, the sheet 10 is moved in the direction as indicated by the arrow A (i.e. sub-scanning direction) and, consequently, the whole area of the sheet 10 is exposed to and scanned by the stimulating rays 2. Upon exposure to the stimulating rays 2, the stimulable phosphor sheet 10 emits light in proportion to the radiation energy stored therein, and the light emitted enters a light guide member 8. The light guide member 8 has a linear light input face 8a positioned close to the scanning line on the stimulable phosphor sheet 10, and a ring-shaped light output face 8b in close contact with the light receiving face of a photodetector 9, which may be a photomultiplier. The light guide member 8 and the photodetector 9 constitute a photoelectric read-out means 7. The light guide member 8 is fabricated of a transparent thermoplastic resin sheet such as an acrylic resin sheet so that the light entering from the light input face 8a can be transmitted to the light output face 8b by total reflection inside of the light guide member 8. The light emitted by the stimulable phosphor sheet 10 upon stimulation thereof is guided inside of the light guide member 8, emitted from the light output face 8b of the light guide member 8 and received by the photodetector 9. The light guide member 8 may be of a shape and a material as disclosed in U.S. Pat. No. 4,346,295.

The light receiving face of the photodetector 9 is provided with a filter (not shown) for transmitting only the light having the wavelength distribution of the light emitted by the stimulable phosphor sheet 10 and cutting off the light having the wavelength distribution of the stimulating rays 2, so that the photodetector 9 can detect only the light emitted by the stimulable phosphor sheet 10 upon stimulation thereof. The light detected by the photodetector 9 is converted into an electric signal, amplified to an appropriate level by an amplifier 11 the sensitivity of which has been adjusted by an amplification degree setting value (a), and then sent to an A/D converter 12. In the A/D converter 12, the electric signal is converted into a digital signal by use of a scale factor which has been set by a scale factor setting value (b) adjusted in advance in accordance with the image pattern of an object to suit the width of signal fluctuation. The digital signal thus obtained is sent to a signal processing circuit 13, in which it is processed to obtain a radiation image suitable for viewing, particularly for diagnostic purposes. The electric image signal obtained by the signal processing circuit 13 is then used to reproduce a visible image on a recording material such as a photographic film or a display device such as a CRT.

In general, the radiation image read-out apparatus is provided with a reflection mirror 14 for obtaining an image of high quality by improving the light guiding efficiency for the light emitted by the stimulable phosphor sheet 10 when it is exposed to the stimulating rays 2. The reflection mirror 14 is positioned on the side opposite to the light guide member 8 with respect to the scanning line of the stimulating rays 2 on the stimulable phosphor sheet 10 so as to reflect the light, which is emitted by the sheet 10 in the direction reverse to the light guide member 8, towards the light guide member 8.

FIG. 3 is a schematic side view taken in the direction as indicated by the arrow B of FIG. 2 and showing the condition of reflection of stimulating rays. In general, in the image read-out as described above, stimulating rays 2a (hereinafter referred to as the scanning stimulating rays) impinging upon the stimulable phosphor sheet 10 for scanning it are reflected by the sheet 10. Reflected stimulating rays 2b are again reflected by various components (the reflection mirror 14, the light input face 8a of the light guide member 8, etc.) of the read-out apparatus onto portions of the sheet 10 that have not yet been scanned, thereby stimulating the non-scanned portions and causing them to emit light (this phenomenon is hereinafter referred to as the flare phenomenon). When the flare phenomenon arises, since the reflected stimulating rays 2b again impinge upon the non-scanned portions of the sheet 10 outside of the picture element detected at a given instant by scanning with the scanning stimulating rays 2a, light emitted by the non-scanned portions is detected by the photoelectric read-out means 7 together with the light emitted by the scanned picture element of the sheet 10. Therefore, the reproduced image thus obtained becomes incorrect, and contrast of the image becomes low.

In the radiation image read-out apparatus provided with the reflection mirror 14, the reflection mirror 14 constitutes a main cause of the flare phenomenon. This is because, though the reflection mirror 14 improves the light guiding efficiency by reflecting the light emitted by the stimulable phosphor sheet 10 towards the light guide member 8, it also reflects the scanning stimulating rays 2a. Therefore, the stimulating rays 2b reflected by the sheet 10 are further reflected by the reflection mirror 14 onto the non-scanned portions of the sheet 10 outside of the scanned picture element, or are reflected thereby onto the light input face 8a of the light guide member 8 and then reflected by the light input face 8a onto the non-scanned portions of the sheet 10.

SUMMARY OF THE INVENTION

The primary object of the present invention is to provide a radiation image read-out apparatus which eliminates at least the flare phenomenon caused by a reflection mirror.

Another object of the present invention is to provide a radiation image read-out apparatus which normally improves the light guiding efficiency for the light emitted by a stimulable phosphor sheet by use of a reflection mirror, and which decreases the flare phenomenon when decrease of the flare phenomenon is more important for viewing purposes than improvement in the light guiding efficiency for the light emitted by the stimulable phosphor sheet.

The present invention provides a radiation image read-out apparatus including a stimulating ray source for emitting stimulating rays for scanning a stimulable phosphor sheet carrying a radiation image stored therein, a photoelectric read-out means for guiding and photoelectrically detecting light emitted by said stimulable phosphor sheet when it is scanned by said stimulating rays, and a reflection mirror positioned in the vicinity of a portion of said stimulable phosphor sheet where said stimulating rays impinge upon said stimulable phosphor sheet, said reflection mirror reflecting said light emitted by said stimulable phosphor sheet towards said photoelectric read-out means, wherein the improvement comprises the provision of a stimulating ray absorbing member for absorbing the stimulating rays reflected by said stimulable phosphor sheet, said stimulating ray absorbing member being positioned for insertion into and withdrawal from the space between said reflection mirror and said portion of said stimulable phosphor sheet where said stimulating rays for scanning said stimulable phosphor sheet impinge upon said stimulable phosphor sheet.

By "stimulating ray absorbing member" is meant a member capable of absorbing the stimulating rays reflected by the stimulable phosphor sheet. The stimulating ray absorbing member may be a plate-like member having a black surface, or the like. Of course, it is also possible to use a member which absorbs the stimulating rays and reflects the light emitted by the stimulable phosphor sheet.

The stimulating ray absorbing member is positioned for insertion into and withdrawal from the space between the reflection mirror and the portion of the stimulable phosphor sheet where the stimulating rays for scanning the stimulable phosphor sheet impinge upon the stimulable phosphor sheet. When the stimulating ray absorbing member is inserted into the space between the incidence position of the scanning stimulating rays on the stimulable phosphor sheet and the reflection mirror, at least the stimulating rays reflected by the sheet towards the reflection mirror are absorbed by the stimulating ray absorbing member, and therefore the flare phenomenon caused by the reflection mirror is avoided. When the stimulating ray absorbing member is withdrawn from the space between the incidence position of the scanning stimulating rays on the stimulable phosphor sheet and the reflection mirror, the reflection mirror exhibits its function of reflecting the light, which is emitted by the sheet towards the reflection mirror, to the light guide member as in the case where no stimulating ray absorbing member is provided.

As provided above, in the present invention, the member for absorbing the stimulating rays reflected by the stimulable phosphor sheet is positioned for insertion into and withdrawal from the space between the reflection mirror and the portion of the sheet where the stimulating rays for scanning impinge upon the sheet. Therefore, when the flare phenomenon need not be decreased, it is possible to withdraw the stimulating ray absorbing member from the space between the incidence position of the scanning stimulating rays on the sheet and the reflection mirror, and to improve the light guiding efficiency for the light emitted by the sheet by efficiently utilizing the function of the reflection mirror. When the flare phenomenon should be decreased, it is possible to insert the stimulating ray absorbing member into the space between the incidence position of the scanning stimulating rays on the sheet and the reflection mirror, and to make the stimulating ray absorbing member absorb the stimulating rays reflected by the sheet towards the reflection mirror. Thus it is possible to avoid at least the flare phenomenon caused by the reflection mirror and to improve the image contrast.

DESCRIPTION OF THE PREFERRED EMBODIMENTS

The present invention will hereinbelow be described in further detail with reference to the accompanying drawings.

Figure 1:
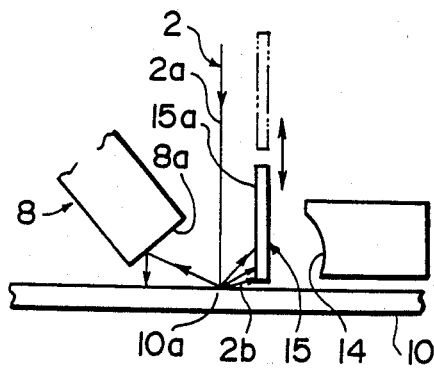
FIG. 1 is a schematic side view showing a major part of an embodiment of the radiation image read-out apparatus in accordance with the present invention.
Figure 3:
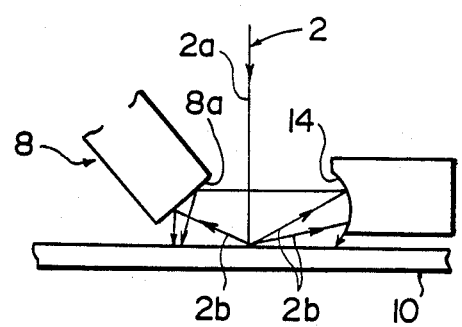
FIG. 3 is a schematic side view taken in the direction as indicated by the arrow B of FIG. 2 and showing the condition of reflection of stimulating rays.

Referring to FIG. 1, as a stimulating ray absorbing member 15, there is used a plate-like member colored in black at least on a surface 15a facing an incidence position 10a of scanning stimulating rays 2a on a stimulable phosphor sheet 10 so that the stimulating ray absorbing member 15 absorbs reflected stimulating rays 2b impinging thereupon. The stimulating ray absorbing member 15 is fabricated vertically moveable to and away from the space between the incidence position 10a of the scanning stimulating rays 2a on the stimulating phosphor sheet 10 and a reflection mirror 14.

In FIG. 1, the solid line for the stimulating ray absorbing member 15 indicates the position thereof inserted into the space between the incidence position 10a of the scanning stimulating rays 2a on the stimulable phosphor sheet 10 and the reflection mirror 14. The chain line indicates the position of the stimulating ray absorbing member 15 withdrawn from the aforesaid space.

Figure 2:
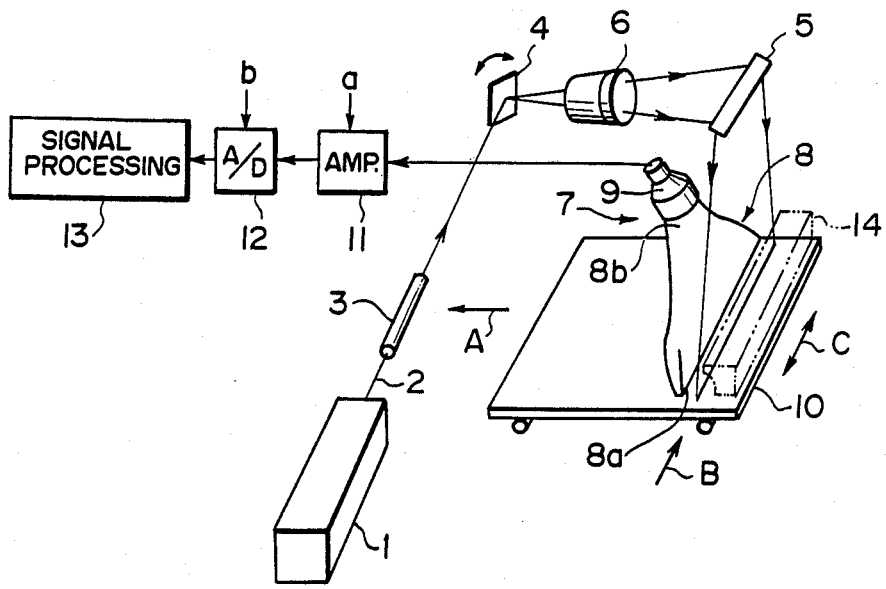
FIG. 2 is a perspective view showing the conventional radiation image read-out apparatus.

When the stimulating ray absorbing member 15 is inserted into the aforesaid space, stimulating rays 2b reflected by the stimulable phosphor sheet 10 towards the reflection mirror 14 are intercepted by the stimulating ray absorbing member 15 and do not impinge upon the reflection mirror 14. In this case, the reflected stimulating rays 2b are absorbed by the stimulating ray absorbing member 15 and are not reflected thereby. The stimulating ray absorbing member 15 is fabricated to a size capable of absorbing the stimulating rays 2b reflected towards the reflection mirror 14. For example, the length of the stimulating ray absorbing member 15 in the transverse direction (at an angle normal to the drawing sheet in FIG. 1, i.e. in the direction as indicated by the arrow C in FIG. 2) is made approximately identical with the transverse length of the stimulable phosphor sheet 10.

When the stimulating ray absorbing member 15 is withdrawn from the aforesaid space, since it is placed in the position where it does not intercept the light emitted by the stimulable phosphor sheet 10 and impinging upon the reflection mirror 14, the reflective mirror 14 exhibits the function of guiding the light emitted by the sheet 10.

The stimulating ray absorbing member 15 should preferably such that it can absorb the stimulating rays 2b reflected by the stimulable phosphor sheet 10 in various directions besides the stimulating rays 2b reflected towards the reflection mirror 14 insofar as the stimulating ray absorbing member 15 does not interrupt incidence of the light emitted by the sheet 10 on the light guide member 8. Therefore, the stimulating ray absorbing member 15 should preferably be fabricated in a shape capable of absorbing as much reflected stimulating rays 2b as possible when the member 15 is inserted into the aforesaid space.

In the aforesaid embodiment, the stimulating ray absorbing member 15 is vertically moved by a known means (not shown) for insertion into and withdrawal from the aforesaid space. However, it is also possible to transversely move the member 15 or to fabricate the member 15 so that it is vertically expandable and shrinkable.

Since the radiation image read-out apparatus of the present invention is fabricated as described above, it is possible to usually have the stimulating ray absorbing member 15 withdrawn from the aforesaid space so that the light guiding efficiency for the light emitted by the stimulable phosphor sheet 10 is improved by the reflection mirror 14. When decrease in the flare phenomenon is more important for viewing, particularly for diagnostic purposes, than improvement in the light guiding efficiency, for example, when a slight difference in contrast should be discriminated as in the case where a tumor image near a portion of the stimulable phosphor sheet exposed to a high radiation dose outside of the object is diagnosed or minute calcification is diagnosed in mammography, it is possible to insert the stimulating ray absorbing member 15 into the aforesaid space, thereby avoiding at least the flare phenomenon caused by the reflection mirror 14 and improving the contrast. Accordingly, it is possible to conduct image read-out in a manner most suitable for purposes of image recording and read-out.

It is possible to judge whether to achieve improvement in the light guiding efficiency for the light emitted by the stimulable phosphor sheet or to achieve decrease in the flare phenomenon on the basis of an image recording portion of an object, such as the chest or abdomen, an image recording method such as plain image recording, contrasted image recording or enlargement, or image recording conditions such as an exposure field size.

Also, there has been proposed a technique of conducting stimulating ray reflection preventing treatment on the reflection mirror or the light input face of the light guide member, for example, overlaying a stimulating ray reflection preventing film thereon. In this technique, since not only prevention of stimulating ray reflection but also reflection or guiding of the light emitted by the stimulable phosphor sheet are required, it is not always possible to accomplish complete prevention of stimulating ray reflection. The radiation image read-out apparatus of the present invention is applicable also to the case where the reflection mirror and/or the light guide member is subjected to stimulating ray reflection preventing treatment as described above.

I claim:

1. A radiation image read-out apparatus including a stimulating ray source for emitting stimulating rays for scanning a stimulable phosphor sheet carrying a radiation image stored therein, a photoelectric read-out means for guiding and photoelectrically detecting light emitted by said stimulable phosphor sheet when it is scanned by said stimulating rays, and a reflection mirror positioned in the vicinity of a portion of said stimulable phosphor sheet where said stimulating rays impinge upon said stimulable phosphor sheet, said reflection mirror reflecting said light emitted by said stimulable phosphor sheet towards said photoelectric read-out means, wherein the improvement comprises the provision of a stimulating ray absorbing member for absorbing the stimulating rays reflected by said stimulable phosphor sheet, said stimulating ray absorbing member being positioned for insertion into and withdrawal from the space between said reflection mirror and said portion of said stimulable phosphor sheet where said stimulating rays for scanning said stimulable phosphor sheet impinge upon said stimulable phosphor sheet.

2. An apparatus as defined in claim 1 wherein said stimulating ray absorbing member is a plate-like member having a black surface.

3. An apparatus as defined in claim 1 wherein said stimulating ray absorbing member is inserted into and withdrawn from said space by use of a movement means for moving said stimulating ray absorbing member vertically or transversely.

4. An apparatus as defined in claim 1 wherein said stimulating ray absorbing member has a length approximately equal to the length of said stimulable phosphor sheet in the transverse direction.

* * * * *